United States Patent
Müller et al.

[11] Patent Number: 5,859,516
[45] Date of Patent: Jan. 12, 1999

[54] SPEED CONTROL FOR ANY OVERRIDE RANGE EFFECTIVE OVER A PLURALITY OF BLOCKS

[75] Inventors: Jürgen Müller, Ludwigsburg; Wolfgang Speth, Grossbottwar; Wilhelm Westermeyer, Nürnberg, all of Germany

[73] Assignee: Siemens Aktiengesellschaft, Munich, Germany

[21] Appl. No.: 836,332

[22] PCT Filed: Nov. 9, 1995

[86] PCT No.: PCT/EP95/04416

§ 371 Date: Aug. 14, 1997

§ 102(e) Date: Aug. 14, 1997

[87] PCT Pub. No.: WO96/15482

PCT Pub. Date: May 23, 1996

[30] Foreign Application Priority Data

Nov. 11, 1994 [EP] European Pat. Off. .............. 94117882

[51] Int. Cl.[6] .................................................. G05B 13/00
[52] U.S. Cl. .......................... 318/561; 318/571; 318/269; 364/574.3
[58] Field of Search ...................... 318/560–574, 318/268–275; 364/474.28–474.35

[56] References Cited

U.S. PATENT DOCUMENTS

| | | | |
|---|---|---|---|
| 4,965,501 | 10/1990 | Hashimoto | 318/595 |
| 4,968,923 | 11/1990 | Busujima | 318/560 |
| 4,994,978 | 2/1991 | Kawamura et al. | 364/474.3 |
| 5,119,250 | 6/1992 | Green et al. | 360/78.06 |
| 5,309,074 | 5/1994 | Mizukami | 318/571 |
| 5,465,035 | 11/1995 | Scaramuzzo, Jr. et al. | 318/561 |
| 5,489,829 | 2/1996 | Umida | 318/561 |

FOREIGN PATENT DOCUMENTS 0 299 080 A1  1/1989  European Pat. Off. .

*Primary Examiner*—Brian Sircus
*Attorney, Agent, or Firm*—Kenyon & Kenyon

[57] ABSTRACT

The invention relates to a method for the anticipatory speed control, effective over a plurality of blocks, of an electric drive, in an anticipatory analysis of the braking requirements of a plurality of subsequent control data blocks. The braking requirements are necessary for the reliable reduction to the programmed feed rate for the electric drive. The limiting conditions such as admissible track acceleration and block length, are projected onto the necessary braking path, so that the shortest braking ramp determined in each case represents the limiting condition. The braking ramps for a plurality of parametrable override transition values are assigned to each control data block analyzed as characteristic data in a data store. In an interpolator unit, in accordance with an actually preset current override value, an interpolation is carried out between the characteristic data determined in order to determine therefrom the block final speed necessary to prevent excessively rapid travel in the subsequent block.

6 Claims, 2 Drawing Sheets

SPEED CONTROL FOR ANY OVERRIDE RANGE EFFECTIVE OVER A PLURALITY OF BLOCKS

BACKGROUND INFORMATION

The present invention relates to a method for the anticipatory speed control of electric drives, in which the speed control is effective over a plurality of blocks.

In modern industrial controllers that are used in machine tools or robots, for example, a feed rate for the speed control of associated electric drives is generally preset block by block in subprograms. In order for the electric drives to operate at a speed that is consistent with the programmed feed rate, an actual feed rate must be able to be reduced in a timely manner. Unless the actual feed rate is reduced within a relatively short time, especially when block download disturbances occur, the electric drive will not be able to stop within a reasonable time from a high feed rate speed. The same problem also occurs when the programmed feed rate of a following data block of the subprogram calls for a reduction in the feed rate that is considerably lower than the current travelled feed rate speed. In this situation, because of the restricted acceleration capabilities of the electric drive, a proper lowering of the currently travelled feed rate speed to the programmed speed of the following block is no longer possible.

This problem of lowering the feed rate is further exacerbated when a feed rate override is provided in order to influence the speed control of the electric drive, especially when the electric drive has a braking path that is proportional to the square of the increase in speed (i.e., the braking path is multiplied fourfold in the case of a doubling of the speed). Such an override permits the programmed absolute feed rate to be varied proportionally in the range from 0 to, for example, 200%, in order to be able to adapt to changed technological circumstances during a machining process. When this feed rate override is used in conjunction with an electric drive having such a braking path relationship, the problem of lowering the current feed rate speed to the speed of the following block becomes exacerbated. Assuming that an intended speed profile is provided with 100% override, and that a reduction of the current feed rate to a lower programmed speed value of the following block is possible within the current block length, it would be impossible to achieve a proper braking if an increase in the override value and the associated quadratic extension of the braking path is implemented. Since the consequence of taking into account such override values over a plurality of blocks is a high computing requirement, it has been attempted to configure a speed control in such a way that a controller which is effective over a plurality of blocks operates rapidly and reliably, even in any override range.

The above-described conventional speed control methods are effective over a plurality of blocks and take into account any override value possibly present. Such conventional methods suffer from at least one of the following drawbacks: either they consider only a single subsequent block (in this regard, see the Siemens SINUMERIK 840 C controller) or else, in the block preamble, they take into account only the preset programmed intended speed profile at 100% override. Hence, on the one hand, anticipatory braking over a plurality of blocks is not possible, or else, in the second case, the override range which it is practical to cover is very severely restricted. Both methods, which are used in accordance with standard procedure, thus have the disadvantage that the efficiency of the electric drive used can generally be utilized only to a limited extent.

SUMMARY OF THE INVENTION

An object of the present invention is to provide an anticipatory speed control method effective over a plurality of blocks, in such a way that overcomes the aforementioned disadvantage. It is intended that a plurality of subsequent blocks be considered in anticipation and, at the same time, that the intended speed profile for any desired override range to be taken into account in the block preamble. As a result, the electric drive that is used in accordance with this method exhibits an improved efficiency.

According to a first embodiment of the present invention, the aforementioned object is achieved with the following combination of features.

In performing an anticipatory determination and analysis of the braking requirements of a plurality of subsequent control data blocks, certain limiting conditions are projected onto the necessary braking path, so that the shortest braking ramp determined in each case represents the limiting condition. Such limiting conditions include admissible track acceleration, rate of change limitation, and block length.

This anticipatory block analysis is carried out for a plurality of parametrable override transition values.

The resultant necessary braking ramps for the respective override transition values are assigned to each control data block analyzed as characteristic data.

In presetting the speed, in accordance with an actually preset current override value, an interpolation is carried out between the characteristic data determined. From this interpretation the actual block final speed necessary to prevent excessively rapid travel in the subsequent block is determined.

A second embodiment of the present invention limits, to a practical extent at constant efficiency, the number of control data blocks to be read in anticipation. According to this embodiment, the number of control data blocks to be analyzed in anticipation is in each case incremented by one data block. The last incremented data block is prepared and then, starting from this newly prepared data block, the previously prepared data blocks are retroactively considered until a speed occurs which is as large as or lower than the programmed intended speed, which is weighted with an override transition value. Finally, a braking ramp is determined therefor.

A third embodiment of the present invention is distinguished by the fact that it can be adapted to an override range preferentially employed by the user. In this embodiment, the number and values of the basic override transition value may be adapted to a desired override range.

A fourth embodiment of the present invention uses the calculations already carried out in the first embodiment. The results obtained from the first embodiment are used to adjust an override value that is practical for the speed control. In this fourth embodiment, the speed control automatically determines the most practical, lowest override value for an anticipatory block analysis by using the above-mentioned limiting conditions. According to this anticipatory block analysis, value braking to the desired subsequent block feed rate can take place via the current block. The necessary braking ramps are determined only for those override transition values which are greater than or equal to the most practical, lowest override value.

In a fifth embodiment, different types of preset feed rates are used to achieve a speed control of an electric drive. In this fifth embodiment, in addition to operating with a feed rate that is preset as a feed rate speed, the method also operates with a preset rotation feed rate. As a consequence, a shaft rotational speed range is also taken into account in the parametrable override transition values. Furthermore, the override value actually given is corrected using a factor taken from the current rotational speed and the intended rotational speed.

In accordance with the present invention, a device for implementing the above-described methods includes a preprocessing unit for the anticipatory block analysis, into which block data and machine data are fed. Parametrable override transition values are stored in a data store and made available to the preprocessing unit for the anticipatory block analysis.

A further data store stores braking ramps that are determined by the preprocessing unit for a plurality of override transition values for a number of subsequent data blocks.

The device further including an interpolator that is in communication with this further data store. In this interpolator, an actual override value is led to an override controller and, using this value, a braking ramp tailored to the actual override value is interpolated from the data in the data store.

The advantages achieved with the invention consist in particular in the fact that the efficiency of the electric drive used is utilized to its fullest potential under any override value at any time. Such advantages may be realized, for example, in the case of use in a numerical controller during the execution of the subprogram on which it is based. Also, in accordance with the present invention, the use of the electric drive is reliable. In carrying out the present invention, an anticipatory block analysis is carried out not only for one subsequent block but for a multiplicity thereof. Furthermore, it is carried out not only on the intended speed profile but also for a plurality of override values.

DETAILED DESCRIPTION

Figure 1:
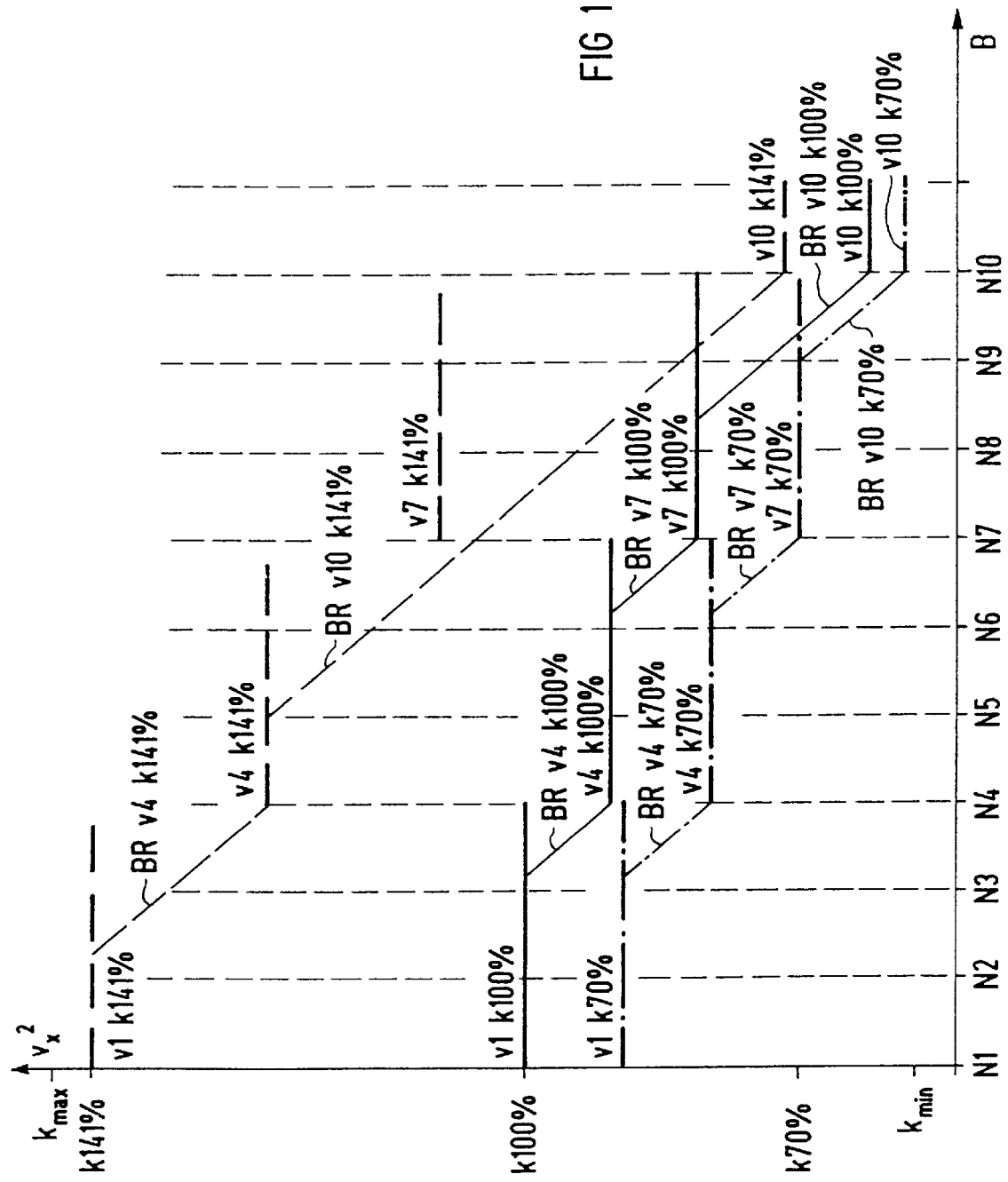
FIG. 1 shows the speed profile over a plurality of control data blocks for different override values, and the course induced thereby of the correspondingly determined braking profile.

FIG. 1 shows a diagram that describes the programmed speed course over ten control data blocks for various set override ranges. Plotted on the abscissa are the individual control blocks N1 . . . N10 over the track length B. The ordinate shows the speed course $v^2_x$, the machine axis in the X dimension having been selected as an example from the further machine axes used.

The speed course $v^2_x$ is plotted as a square in order, for reasons of improved clarity, to be able to be sketched linearly in relation to the braking path.

The speed course is firstly shown in the form of the programmed intended speed profile with an override value of 100% by means of the course k100% in the form of a continuous line. The speed course k141% shows the same course with an override of 141% in the form of a dashed curve. A third speed course for a lower override, shown here by way of example using an override of 70%, is shown by k70% and is represented by a chain-dotted line. By way of an example, the speed is guided independently of the respectively considered override value. In FIG. 1, the speed runs at different constant levels for different sets of blocks. Thus, the speed runs constantly from blocks N1 to N3. In blocks N4 to N6, the speed runs at a lower constant level. Similarly, for blocks N7 to N9 and block 10, respectively, the speed runs at even lower, but constant, speeds. These partial speed sections are in each case designated as a function of the block at which the next constant speed section begins. In the case of the programmed intended speed course of the 100% override, these are the speeds v1k100%, v4k100%, v7k100%, and v10k100%. For the speed course corresponding to 141% override, the speed segments shown are designated by v1k141%, v4k141%, v7k141%, v10k141%. For the speed course corresponding to the 70% override, the speed segments are designated by v1k70%, v4k70%, v7k70%, and v10k70%. The necessary braking ramps for the respectively considered override values of a speed course are represented as falling linear sections. For the purpose of better illustration, this is a special case in which braking takes place with the same acceleration at all speeds. However, this is not necessary, since in practice another acceleration may occur for each block according to the invention.

Figure 2:
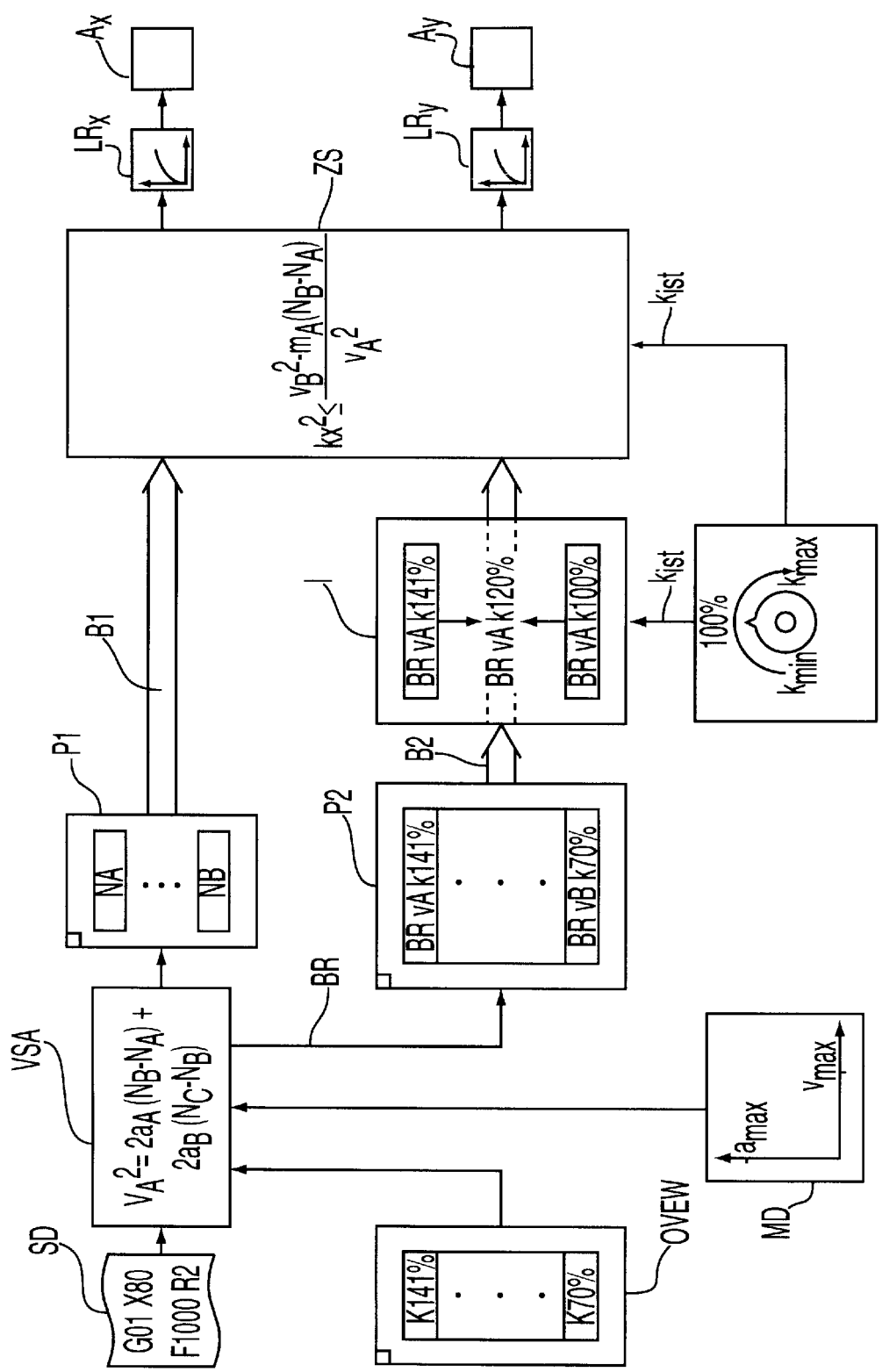
FIG. 2 shows a block diagram of a numerical controller with a speed control for any override range, effective over a plurality of blocks.

FIG. 2 shows a block diagram in which a device for implementing the method according to the invention is realized. In this case, the control data SD passes into an anticipatory block analysis preprocessing unit VSA. The override transition values stored in a data store OVEW, as well as the data stored in machine data store MD, which correspond to the limiting conditions such as maximum admissible track speed $v_{max}$ and maximum admissible track acceleration $a_{max}$, are also supplied to preprocessing unit VSA. In the preprocessing unit VSA, on the one hand, the information about the data blocks N1 . . . N10 analyzed in anticipation is determined and stored in a data store P1, and, on the other hand, the shortest possible braking ramp BR determined for each override transition value, which is contained in OVEW, for the subsequent blocks N1 . . . N10 analyzed in anticipation are stored in a further data store P2. The analyzed block data N1 . . . N10 from P1 pass via a databus P1 to the central control unit ZS. The braking ramp information BR passes via a further databus B2 to an interpolation unit I, into which current override current values $k_{ist}$ from one or more override controllers OVR also pass. Using $k_{ist}$, a braking ramp referred to the current override is interpolated in interpolation unit I with the aid of the data contained in P2. The braking ramp is fed via the databus B2, which is looped through interpolation unit I, to the central control unit ZS, to which likewise the override actual values $k_{ist}$ from any other axes which may be present are fed. From there the generated intended values for each axis pass into a corresponding position controller LRx and, respectively, LRy, and from there to the electric drive Ax and, respectively, Ay.

In order to realize speed control which, according to the present invention, enables an effect over a plurality of blocks for any override range, the anticipatory reading of control data blocks SD, also designated "look ahead", is divided into two regions. At the start, also called the preparation, there is an anticipatory analysis of the necessary braking requirements of a plurality of control data blocks N1 . . . N10. In a second step, this is joined by a current speed preset for the end of the block, taking into account a current override. In a first step, therefore, an anticipatory block analysis is carried out during which the required braking requirements are determined, in that all limiting conditions are projected onto the braking path to be determined. Such limiting conditions include admissible track acceleration, track speed, any rate of change limitation present, and also the block length. Subsequently, the shortest braking ramp BR determined in each case itself forms the limiting condition.

However, since these braking requirements to be determined in this way are not intended to be determined only for the intended speed profile at k100% override, but rather the anticipatory block analysis is intended also to be carried out over any override range, the respectively different influence of an adjusted override value on the required braking requirements is taken into account. The necessary braking requirements are therefore determined not merely for an override of the intended speed profile k100%, but also for further parametrable override transition values. In the example cited, these are an override of k141% and an override of k70%. In practice, however, a series of further override transition values could be considered, for example, at 50%, 70%, 100%, 120%, 141%, etc. The scale of the override transition values covered depends in each case on the application and the accuracy to be achieved. In this case, the number and the value of the override transition values can be adapted to an override range desired by the operator.

In order to determine the necessary braking requirements, in each case the subsequent data block is analyzed and prepared. Then, in each case a sufficient number of previous control data blocks are read until, in a comparison of the respectively current prepared data block with the previous block, either an equally large or a lower speed than the speed momentarily being considered is found. This speed is determined from the intended speed multiplied by the override transition value k141% . . . k70% being considered. Using the number of data blocks analyzed in this way, the braking ramps can be determined with the aid of this information.

A speed $v_A$ lying further "in the future" is then of significance for the block final speed in the current block if this speed is either lower than that in the previous current block. Alternatively, speed $v_A$ would also be of significance if the override kAB is so large that another restriction becomes relevant because of the squared relationship between override-induced speed and braking path. In this situation, the speed $V_B$ of a block lying still further "in the future" becomes relevant. In this case, an adaptation of the braking ramp already determined may be necessary. This relationship can be illustrated by means of the following calculation rule:

$$k_x^2 v_A^2 \leq v_B^2 - m_A(N_B - N_A) \tag{1}$$

where

A=beginning of a subsequent block,

B=end of a further subsequent block, $v_A$=speed at track point A, $v_B$=speed at track point B, $m_A$=negative admissible track acceleration as limiting condition in the block from A to B, $N_A$=location of the beginning of a subsequent block on the track curve, $N_B$=location of the end of the subsequent block on the track curve, and $k_x$=override transition value being considered.

In order to represent the different influence of the override value being used, this calculation rule is solved for the override factor. This yields:

$$k_x^2 \leq \frac{v_B^2 - m_A(N_B - N_A)}{v_A^2} \tag{2}$$

If this condition for the respective override transition value to be investigated is fulfilled, then the block final speed of the current data block is determined by means of the entry speed VA of the subsequent control data block. Otherwise, the entry speed of the next-but-one subsequent block $v_B$, viewed from the current control data block, determines the block final speed of the current control data block. Depending on the amount of subsequent blocks to be read in anticipation, effective over a plurality of blocks, the override transition values are checked for the abovementioned condition. FIG. 1 illustrates the first-mentioned case, in which the block final speed of a current control data block results from the entry speed of the subsequent block A. This case corresponds to the programmed intended speed course generated in accordance with an override value of k100%. Thus, for example, the course of the braking ramp BRv7k100% in the control data block N6 is conditioned by the speed v7k100% following the instantaneous speed v4k100%. This is due to the fact that, for the override value of 100%, there is the possibility of braking within the data block N6 to the entry speed of the subsequent data block N7 using the shortest braking ramp BRv7k100% representing the limiting conditions. This relationship may also be inferred from the designation of the braking ramp just cited.

By contrast, the situation appears different if the speed course for an override value of k141% is considered. Thus, the course of the braking ramp BRv10k141%, which starts from the speed v4k141%, is not conditioned by the speed change v7k141% occurring in the subsequent block N7, but by the entry speed v10k141% of the subsequent block N10 lying further "in the future". This resides in the fact that in the case of an override provided which is located higher than the intended speed profile (k141% in this example), the track lengths of the control data blocks N7, N8, and N9 travelled at the speed of v7k141% are not sufficient, while being based on the admissible track acceleration, in order to brake to the entry speed v10k141% which is necessary in the control data block N10, which corresponds to a preset of v10k141% as the block final speed for the data block N9.

By contrast, this relationship appears different in the case of the programmed intended speed course of the override value k100%. Because of the smaller speed being travelled, the braking path necessary for the braking, which is a function of the square of the speed, is correspondingly shorter, so that it is possible to brake directly from v7k100% to v10k100%. Accordingly, the selection of the override value decides which of the control data blocks will be analyzed to determine the block final speed of a data block currently being traversed. For this reason, according to the present invention, the necessary braking requirement is determined for the intended speed profile and for a plurality of parametrable override transition values.

The braking ramps which are necessary for the respective override transition value are determined in accordance with the following rule. For reasons of simplicity, only two subsequent blocks are analyzed in anticipation in this example.

$$v_A^2 = m_A(N_B - N_A) - m_B(N_C - N_B) \tag{3}$$

with A,B,C=consecutive blocks with $m_i$=negative slope or negative acceleration in data block i with $N_i$=starting point of the data block i on the track length.

If the following is set for the negative slope:

$$m_i = -2a_i \quad (4)$$

then the following results therefrom for the calculation rule (3)

$$v_A^2 = 2a_A(N_B - N_A) + 2a_B(N_C - N_B) \quad (5)$$

Using the standard acceleration a, it is true that:

$$a_i = p_i a \quad (6)$$

From this, there follows for the calculation rule (3):

$$v_A^2 = 2p_A a(N_B - N_A) + 2p_B a(N_C - N_B) \quad (7)$$

In order to be able to represent the braking ramps in a linear fashion in FIG. 1, for reasons of improved clarity, the calculation rule is normalized by means of:

$$(N_B - N_A) = 1/p_i(N_B - N_A)' \quad (8)$$

The necessary braking ramps resulting from this for the respective override transition values k141%, k70%, and so on are given at the same time to each data block N1 ... N10 as characteristic data in the form of reference points.

The second phase of the present invention involves the use of anticipatory block analysis for any override range. The actual main run, in the current speed preset at the block end, includes the current override value. In this second phase, an interpolation is carried out between the characteristic data of the stored braking ramps for the override transition values in accordance with the actually preset override value $k_{ist}$ and the required block final speed is thus determined, which ensures that travel into the subsequent block is not too fast. The interpolation is carried out according to the following calculation rule:

$$\frac{(k_{ist}^2 - k\,100\%^2) \cdot (v_{x+1}^2 - v\,100\%^2)}{(k_{x+1}^2 - k\,100\%^2)} + v\,100\%^2 = v_{ist}^2 \quad (9)$$

Using the admissible track acceleration, track speed, and block length, the control determines the most practical, lowest override value $k_{min}$ automatically, that is to say the override value according to which it is possible to brake over the block to the desired subsequent block feed rate. Since a smaller override value generally does not require an anticipatory block analysis, the braking ramps are determined only to the extent necessary. Accordingly, this is always the case when the current override value $k_{ist}$ is greater than or equal to the most practical, lowest override value $k_{min}$. This has the effect that time is gained in the preparation, since not all the transition values which are parametrable by the user are taken into account, but only those for which a determination of the braking ramps BR makes sense. If the same feed rate is always programmed, taking the braking ramps into account thus produces only an insignificant extra effort.

If, in the case of the parametrable override transition values, a possible shaft rotational speed range is taken into account, then the method outlined above may also be carried out with a feed rate preset as rotation feed rate instead of with a feed rate speed as feed rate preset. For this purpose, the rotational speed is projected onto a factor which is formed from the ratio of actual rotational speed $n_{ist}$ and the intended rotational speed n100% programmed in the block data SD. This is done in order to be able to operate here too with the braking ramps BR determined in accordance with the method represented above. The override value $k_{ist}$ actually present is corrected in accordance with the following calculation rule, using the determined factor:

$$k_{korr} = k_{ist} \cdot \frac{n_{ist}}{n\,100\%} \quad (10)$$

In a possible device for implementing the method described according to the invention, the parametrable override transition values k141% ... k70% are stored in a data store OVEW and are fed to a preprocessing unit for the anticipatory block analysis VSA. In addition, the machine data MD, such as the maximum admissible track speed $v_{max}$ and track acceleration $a_{max}$, are made available to the preprocessing unit VSA in order to perform the anticipatory block analysis VSA. These values represent the limiting conditions, which are imaged onto the braking requirements that are necessary and are to be determined in the preprocessing unit VSA. At the same time, values from, for example, a rate of change limitation can also be taken into account. With the aid of this information, in the preprocessing unit VSA, the braking ramps BR necessary for the override transition values stored in OVEW are determined in anticipation for a plurality of subsequent blocks N1 ... N10 in accordance with the equations (3) to (8) and stored in a data store P2. In addition, the preprocessing unit for the anticipatory block analysis VSA can take over still further functions for the preprocessing of the analyzed data blocks SD, in that, for example, important track parameters are already calculated at this point. The data determined in this way of the analyzed subsequent blocks N1 ... N10, the number of which may differ depending on the application and generally lies in the range of 5 to 50 blocks, is stored in another data store P1. From there, the data passes via a databus B1 to the central controller ZS for further processing. In a special case, preprocessed track parameters and determined braking ramps can also be stored in a single data store, if reference points of the programmed intended speed profile are stored together with the braking ramps applied to them. In the exemplary embodiment described further above, only the determined required braking ramps BR are led via a second databus B2 to an interpolation unit I.

Any actually set override values $k_{ist}$ which may be present also pass to the interpolation unit I from one or more override controllers OVR. In the block diagram in FIG. 2, for reasons of improved clarity, only one override controller OVR is shown. Using $k_{ist}$, an interpolation is carried out in interpolation unit I between the braking ramps BR which are stored in P2 and approach most closely. The braking courses determined in this way for the data blocks N1 ... N10 analyzed in anticipation are likewise led via the databus B2, looped through interpolation unit I, to the central controller ZS, where the necessary block final speed is determined in accordance with the calculation rules (1) and (2) represented above. For this purpose, the central controller ZS is likewise fed any current override actual values $k_{ist}$ which may be present. In ZS, finally, the axis setpoints for driving the axes to be travelled are generated. For the case of two axes in the x-direction and y-direction, axis setpoints thus pass to in each case one position controller LRx and, respectively, LRy and from there in each case to the corresponding electric drive Ax and, respectively, Ay.

We claim:

1. A method for implementing an anticipatory speed control of an electric drive over a plurality of data blocks, comprising the steps of:
   a) projecting a plurality of limiting conditions onto each one of a plurality of braking paths of the electric drive in order to determine a shortest braking path representing one of the plurality of limiting conditions, wherein the plurality of limiting conditions includes an admissible track acceleration, a rate of change limitation, and a data block length, wherein the step a) is performed in an anticipatory determination and analysis of a plurality of braking requirements corresponding to the plurality of data blocks, and wherein the anticipatory determination and analysis is carried out for a plurality of variable override transition values, each one of the braking paths corresponding to one of the override transition values;

b) assigning each braking path for the respective override transition values to a corresponding one of the data blocks analyzed as characteristic data; and c) interpolating among the override transition values in accordance with a present current override value in order to determine an actual block final speed necessary to prevent excessively rapid travel in a subsequent data block.

2. The method according to claim 1, wherein for the data block subsequent to a current data block, the data blocks prior to the data block subsequent to the current data block are considered in order to determine a speed that is no larger than a programmed intended speed weighted with at least one of the plurality of override transition values.

3. The method according to claim 2, wherein the amount and values of the override transition values are adapted to a desired override range.

4. The method according to claim 3, further comprising the steps of:

d) determining a lowest override value in accordance with the plurality of limiting conditions, wherein the lowest override value is used to brake the electric drive to a predetermined feed rate of the subsequent data block via the current block; and e) determining braking paths corresponding to transition values that are at least equal to the lowest override value.

5. The method according to claim 4, wherein the steps a) to c) are performed in accordance with a preset rotation feed rate, wherein the override transition values include a shaft rotational speed range, and wherein the preset current override value is corrected using a factor determined from a current rotational speed and an intended rotational speed.

6. A device for implementing an anticipatory speed control of an electric drive over a plurality of data blocks, comprising:

a preprocessing unit for performing an anticipatory block analysis, wherein block data and machine data are supplied into at least one input of the preprocessing unit, wherein the preprocessing unit determines a braking path for each one of a plurality of override transition values for each of the data blocks;

a first memory for storing the plurality of override transition values, the first memory being coupled to the preprocessing unit;

a second memory for storing each determined braking path, the second memory being coupled to the preprocessing unit;

at least one override controller; and an interpolator unit for using an actual override value, wherein a braking path tailored to the actual override value is interpolated from the braking path data stored in the second memory, and wherein the interpolator is coupled to the at least one override controller and to the second memory.

* * * * *